United States Patent [19]
Uchida et al.

[11] 4,344,669
[45] Aug. 17, 1982

[54] COATED GLASS FIBERS FOR OPTICAL TRANSMISSION

[75] Inventors: Naoya Uchida, Mito; Masaaki Yoshida; Toru Yamanishi, both of Yokohama, all of Japan

[73] Assignees: Nippon Telegraph & Telephone Corporation, Tokyo; Sumitomo Electric Industries, Ltd., Osaka, both of Japan

[21] Appl. No.: 91,997

[22] Filed: Nov. 7, 1979

[30] Foreign Application Priority Data

Nov. 7, 1978 [JP] Japan .................................. 53/137660

[51] Int. Cl.³ ............................................. G02B 5/172
[52] U.S. Cl. ................................ 350/96.30; 350/96.34; 428/375; 428/391
[58] Field of Search ............... 350/96.30, 96.31, 96.33, 350/96.34; 65/3.11, 3.41, 3.43, 3.44; 427/163; 428/375, 378, 391, 429

[56] References Cited

U.S. PATENT DOCUMENTS

| | | | |
|---|---|---|---|
| 3,980,390 | 9/1976 | Yamamoto et al. | 350/96.33 |
| 4,114,981 | 9/1978 | Ishida et al. | 350/96.33 |
| 4,147,407 | 4/1979 | Eichenbaum et al. | 350/96.34 |
| 4,270,840 | 6/1981 | Uchida et al. | 350/96.34 |

*Primary Examiner*—John D. Lee
*Attorney, Agent, or Firm*—Sughrue, Mion, Zinn, Macpeak & Seas

[57] ABSTRACT

A glass fiber for use in optical transmission which comprises a first layer containing an organopolysiloxane having a refractive index higher than that of the glass which forms the outermost layer of the glass fiber, a second layer comprising an organopolysiloxane which is the same or different than the organopolysiloxane in the first layer, and a thermoplastic resin coated on the second layer in a thickness less than about 100 microns.

5 Claims, 8 Drawing Figures

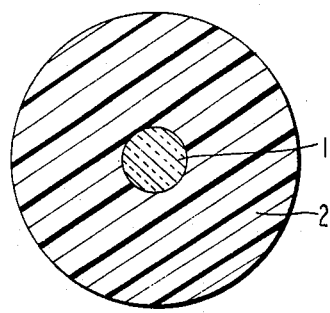
FIG 1
PRIOR ART
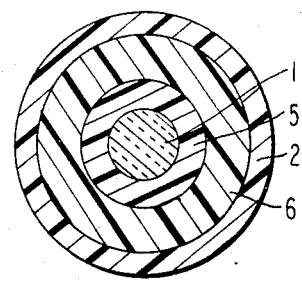
FIG 4A
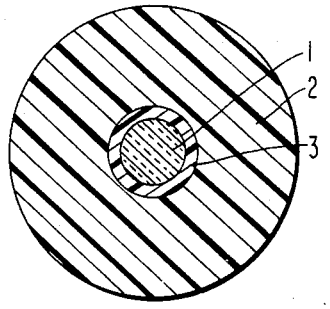
FIG 2
PRIOR ART
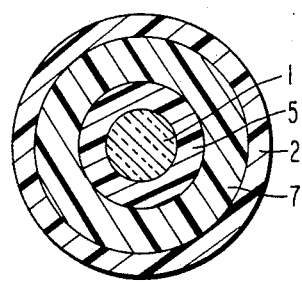
FIG 4B
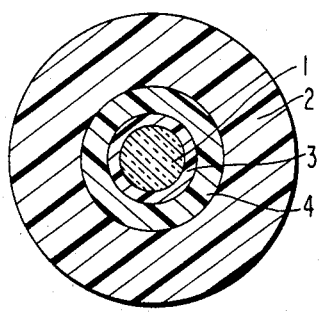
FIG 3
PRIOR ART
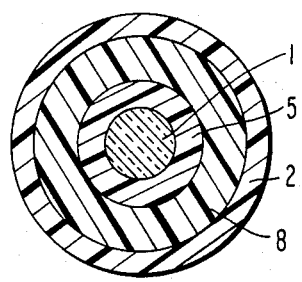
FIG 4C
FIG 5
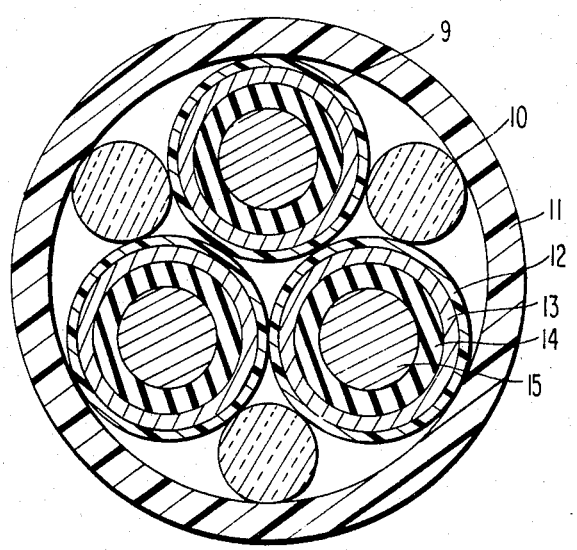
FIG 6
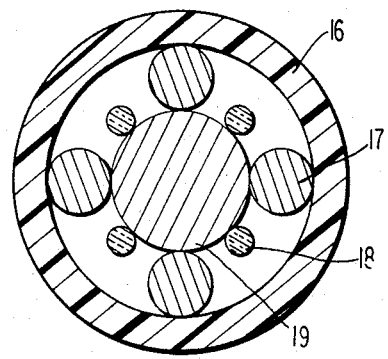

COATED GLASS FIBERS FOR OPTICAL TRANSMISSION

BACKGROUND OF THE INVENTION

1. Field of the Invention

This invention relates to a highly heat-resistant glass fiber for use in optical transmission (hereinafter referred to as an optical fiber) and to a process for producing the same.

2. Description of the Prior Art

With the recent advancement of fiber optics technology on reducing light loss due to absorption by an optical fiber, many attempts have been made to use the optical fiber as a medium for communication, and the day is not far off when commercial application of optical transmission will be achieved. While optical fibers housed in a cable (hereunder referred to as an optical cable) can be used for a variety of communication modes, the electrical noninduction of the optical fiber has interested researchers in the possibility of combining the optical cable with a power cable in a composite communication power cable. Therefore, various methods have been proposed for housing optical fibers within a power cable and using them to transmit control or communication signals. In addition, some methods are being subjected to field testing.

It is known that the conductor and neighboring area of a power cable, especially a high-tension cable, are heated to about 90° C. by the Joule effect. Therefore, it is necessary to ensure that an optical fiber exposed to this temperature level for a long period of time will not undergo any change in its transmission or mechanical characteristics.

An optical fiber is generally protected with a plastic coating to increase its mechanical strength or to make its handling easier. Accompanying FIGS. 1 to 3 illustrate the coating of optical fibers proposed to date. Therein 1 is a glass fiber, 2 is a primary coating layer of a thermoplastic resin, 3 is a primary coating layer of a thermosetting resin, and 4 is a buffering layer made of a resin with small Young's modulus or a foamed resin. According to the study of the present inventors, if the coating of the optical fiber (hereunder referred to as simply as an optical fiber) is exposed to high temperatures, shrinkage due to the residual strain carried over from molding of plastics or a change in the volume accompanying higher crystallinity will increase the "clamping" effect on the fiber interior to cause a phenomenon generally referred to as "micro-bending", which in turn results in greater transmission loss.

With the above point in mind, research was carried out to provide a highly heat-resistant optical fiber and an optical cable housing such fiber. Thus the present invention provides a glass fiber for use in optical transmission which comprises a first layer containing an organopolysiloxane having a refractive index higher than that of the glass which forms the outermost layer of the glass fiber, a second layer comprising an organopolysiloxane which is the same or different than the organopolysiloxane in the first layer, and a thermoplastic resin coated on the second layer in a thickness less than about 100 microns.

BRIEF DESCRIPTION OF THE DRAWINGS

FIGS. 1 to 3 illustrate conventional optical fiber coatings;

FIGS. 4A, 4B, and 4C are a cross section of one embodiment of the highly heat-resistant core of an optical fiber according to the present invention;

FIG. 5 is a cross-sectional view of the composite cable according to the present invention which combines an optical cable with a power cable; and FIG. 6 is an enlarged view of the optical cable shown in FIG. 5.

DETAILED DESCRIPTION OF THE INVENTION

The terms "first" and "second" are used herein with respect to the order in which the respective coatings occur from the surface of the optical fiber.

Generally, curable organopolysiloxane compositions having a refractive index higher than that of the glass forming the outermost layer of the glass fiber used in the first layer according to the present invention has a basic structure comprising the polysiloxane bond of Si-O-Si and phenyl groups as side chain substituents. A representative phenyl polysiloxane composition basically comprises

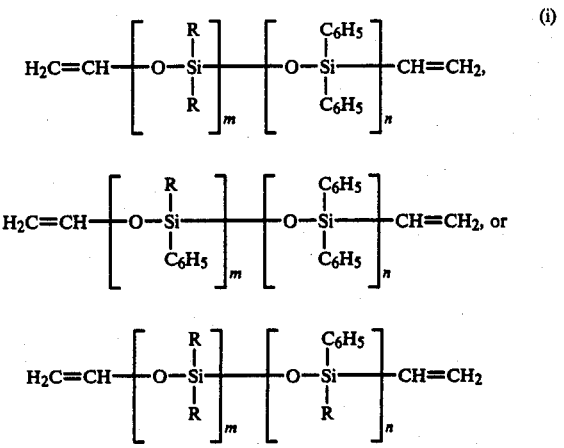

wherein R is a substituted or unsubstituted monovalent hydrocarbon group having no aliphatic unsaturation, (ii) an organohydrodiene polysiloxane component having in its molecule at least 3 hydrogen atoms directly bonded to a silicon atom contained in an amount sufficient to provide 0.7 to 5 such hydrogen atoms per vinyl group of the component (i), and (iii) a catalytic amount of platinum compound. Examples of the suitable platinum compound are those which are highly compatible with the above two components, such as an olefin complex, or a chloroplatinic acid in which part of chlorine may or may not be substituted with alcohol, aldehyde or ketone. For the purpose of increasing the mechanical strength of the cured product and fluidity of the composition, these three components may be combined with an organopolysiloxane composition comprising $(CH_2=CH)R_2SiO_{0.5}$, $R_3SiO_{0.5}$ and $SiO_2$ wherein R is a substituted or unsubstituted monovalent hydrocarbon group having no aliphatic unsaturation, the molar ratio of the sum of $(CH_2=CH)R_2SiO_{0.5}$ and $R_3SiO_{0.5}$ to $SiO_2$ being in the range of from 0.5 to 2.0 and the content of vinyl group being in the range of from 0.5 to 3 wt%. The phenyl content in this phenyl polysiloxane composition can be adjusted to control its refractive index within the range of from about 1.40 to about 1.52. In the formulae m and n are positive integers such that the phenyl polysiloxane composition has the desired refractive index and a viscosity at 25° C. of from 50 to 100,000 centistokes, preferably from 1,000 to 10,000 centistokes. The only requirement for the curable organopolysiloxane composition for the first layer is that the composition has a refractive index higher than that of the glass which forms the outermost layer of the glass fiber, i.e., 1.458 or more, and other compositions than the above are suitable.

Typical examples of phenylpolysiloxane compositions are commercially available such as OF 103 (a product of Shinetsu Chemical Industry Co., Ltd., Japan) and CY-52-162 (a product of Toray Silicon Co., Ltd., Japan).

The thickness of the first layer is preferably 10 to 30 μm.

The second layer can be either (1) a phenyl polysiloxane composition as above, (2) a trifluoroalkyl group-containing curable organopolysiloxane or (3) a curable organopolysiloxane containing a substituted or unsubstituted monovalent hydrocarbon group having no aliphatic unsaturation in the side chains thereof such as dimethylpolysiloxane. The above phenyl polysiloxane composition (1) has a high heat-resistant property and a high refractive index, but is relatively expensive. The trifluoroalkyl group-containing curable organopolysiloxane also has a high heat-resistant property but has a relatively low refractive index, generally less than 1.458 and, therefore, it cannot be used as a first coating. The curable organopolysiloxane (3) has no high heat-resistant property, but is relatively inexpensive and can be cured rapidly. These materials are suitably used depending on the specific properties desired for the second layer.

The refractive index of the second coating is not critical, but the polysiloxane used for the second coating preferably has a viscosity of about 50 to about 100,000 centistokes, more preferably 1,000 to 10,000 centistokes, at 25° C.

The polysiloxane used for the first and second layer preferably has a Young modulus less than 0.5 kg/mm$^2$. The second layer may contain a filler such as fume silica, precipitated silica, aluminum silicate, quartz powder, fused quartz powder, diatomaceous earth, calcium carbonate, titanium dioxide and carbon black. The amount of fillers in the second layer is preferably limited in such a manner that the modulus of polysiloxane does not exceed 0.5 kg/mm$^2$. The thickness of the second coating is preferably 50 to 200 μm. When the organopolysiloxane in the first and second layers are the same, they may be combined into a single coating.

The most important difference in the requirements for the first and second coatings is that the first coating must have a refractive index of 1.458 or less which is not required for the second coating.

The thermoplastic resin coated on the second layer can consist of a thermoplastic resin alone or be a resin composition comprising a thermoplastic resin, other resins, inorganic fillers, organic fillers, cross-linking agents, pigments and/or dyes. Any thermoplastic resins or compositions thereof can be used so long as they are capable of being coated by the melt extrusion method, but particularly preferred thermoplastic resins are nylon-12, nylon-11, nylon 610, nylon 66, nylon 6, nylon copolymer, nylon mixture, high density polyethylene, low density polyethylene, polycarbonate, ionomer resins, polyethylene terephthalate, polybutylene terephthalate, Noryl resin, polypropylene, polymethyl methacrylate, polystyrene, polyurethane, polypropylene, polytetrafluoroethylene, polychlorotrifluoroethylene, tetrafluoroethylene-hexafluoropropylene copolymer, ethylenetetrafluoroethylene copolymer, polyfluorinated vinylidene, ethylene-chlorofluoroethylene copolymer and the like.

The present invention is further illustrated with reference to the accompanying drawings.

In FIGS. 4(a), 4(b) and 4(c), 1 is a glass fiber, 5 is a silicone resin with high refractive index containing a phenyl group, 2 is a layer of thermoplastic resin less than 100 μm thick, 6 is a layer of silicone resin containing a trifluoroalkyl group, 7 is a silicone resin containing a phenyl group, 8 is a layer of silicone resin having incorporated therein a filler such as fume silica. The third coating layer of thermoplastic resin of the optical fiber so coated as illustrated in FIG. 4 is less than 100 μm thick, and therefore, the fiber will suffer only a small shrinkage due to the residual strain carried over from the molding of said thermoplastic resin or the change in the volume of the core due to increasing crystallinity is very small, and in consequence, the fiber will suffer no substantial microbending due to increased "clamping" effect acting upon the interior. The lower limit on the thickness of the thermoplastic resin is not critical, but is necessarily limited by the production technique used for forming thin layers.

According to the studies conducted by the present inventors, if the third coating layer is more than 100 μm thick, a higher degree of crystallization results in reduced volume of the fiber which in turn causes the glass fiber to be clamped and causes microbending and leads to greater transmission loss. On the other hand, the optical fiber according to the present invention will suffer no substantial increase in transmission loss if it is exposed to 100° C. or higher for an extended period of time. Further, since the first coating layer 5 has a refractive index higher than that of glass, no undesirable clad mode transmission will occur. The second coating layers 6, 7 and 8 are highly resistant to heat and will undergo only a small change in their physical properties even if they are exposed to high temperatures.

According to the studies conducted by the present inventors, the optical fiber so coated as shown in FIG. 4 suffers no substantial increase in transmission loss if it is exposed to 120° C. for a period of one year or longer; estimates of the measurements by the Arrhenius formula indicate that the characteristics of the fiber will remain stable at 90° C. for a period of 10 years or longer. Also, in order to produce an optical fiber having high strength, it is desirable to coat a melt-spun glass rod immediately with the first layer of silicone resin before it contacts other materials. It is also possible to increase the production speed of optical fibers by using a silicone resin which is cured upon exposure to ultraviolet rays. It is to be noted that the first or second coating layer of the silicone resin need not be formed of a single layer; instead, it may have a multilayer structure composed of the same or different materials.

FIG. 6 shows one embodiment of the optical cable that houses the optical fiber illustrated in FIG. 4, and FIG. 5 shows one embodiment of a composite cable which has the optical cable of FIG. 6 combined with a power cable. While four fibers are housed in the cable of FIG. 6, any desired number of fibers can be used. In addition, the characteristics of the cable can be stabilized more effectively with a V- or U-shaped interstitial spacer or heat insulating material. Likewise, more than three optical cables may be housed in the composite cable shown in FIG. 5. In FIG. 5, 9 is a power cable, 10 is an optical cable, 11 is an outer coat, 12 is an outer coat, 13 is an external conductor, 14 is an insulating layer, and 15 is an internal conductor. In FIG. 6, 16 is an outer coat, 17 is an interstitial quad, 18 is an optical fiber and 19 is a tension member.

While the invention has been described in detail and with reference to specific embodiments thereof, it will be apparent to one skilled in the art that various changes and modifications can be made therein without departing from the spirit and scope thereof.

What is claimed is:

1. A glass fiber for use in optical transmission which comprises a first layer containing an organopolysiloxane having a refractive index higher than that of the glass which forms the outermost layer of the glass fiber, a second layer comprising an organopolysiloxane which is the same or different than the organopolysiloxane in the first layer, and a thermoplastic resin coated on the second layer in a thickness less than about 100 microns.

2. A glass fiber for use in optical transmission according to claim 1, wherein said first coating layer is made of a silicone resin comprising a curable organopolysiloxane that contains a phenyl group.

3. A glass fiber for use in optical transmission according to claim 1, wherein said second coating layer is made of a silicone resin comprising a curable organopolysiloxane that contains a trifluoroalkyl group.

4. A glass fiber for use in optical transmission according to claim 1 or 3, wherein said second coating layer is made of a silicone resin comprising as a main component a curable organopolysiloxane having incorporated therein at least one member selected from the group consisting of fume silica, precipitated silica, aluminum silicate, quartz powder, fused quartz powder, diatomaceous earth, calcium carbonate, titanium dioxide and carbon black.

5. A glass fiber for use in optical transmission according to claim 1, wherein said thermoplastic resin layer is made of a thermoplastic resin selected from the group consisting of nylon 12, nylon 11, nylon 610, nylon 66, nylon 6, nylon copolymer, nylon mixture, high density polyethylene, low density polyethylene, polycarbonate, ionomer, polyethylene terephthalate, polybutylene terephthalate, Noryl resin, polymethyl methacrylate, polystyrene, polyurethane, polypropylene, tetrafluoroethylene-hexafluoropropylene, copolymer, polyvinylidene fluoride, ethylene-tetrafluoroethylene copolymer, and ethylene-chlorotrifluoroethylene copolymer.

* * * * *